United States Patent [19]

Roberts et al.

[11] Patent Number: 4,464,701

[45] Date of Patent: Aug. 7, 1984

[54] PROCESS FOR MAKING HIGH DIELECTRIC CONSTANT NITRIDE BASED MATERIALS AND DEVICES USING THE SAME

[75] Inventors: Stanley Roberts, South Burlington; James G. Ryan, Essex Junction, both of Vt.

[73] Assignee: International Business Machines Corporation, Armonk, N.Y.

[21] Appl. No.: 527,454

[22] Filed: Aug. 29, 1983

[51] Int. Cl.$^3$ .......................... H01G 4/10; H01G 4/06
[52] U.S. Cl. .................................. 361/313; 361/322; 427/79
[58] Field of Search .................. 427/79; 361/311, 312, 361/313, 322

[56] References Cited

U.S. PATENT DOCUMENTS 3,786,323  1/1974  Peters et al. ........................ 361/322

FOREIGN PATENT DOCUMENTS 1120023  12/1961  Fed. Rep. of Germany ........ 427/79
907020   9/1962  United Kingdom ................ 361/322

Primary Examiner—Donald A. Griffin
Attorney, Agent, or Firm—George Tacticos

[57] ABSTRACT

An improved method of fabricating a stable high dielectric constant and low leakage dielectric material which includes oxidizing at a temperature of about 600° C. or higher a layer of a mixture of a transition metal nitride and silicon nitride to produce a mixture which includes an oxide of the transition metal and silicon nitride. The initial mixture of transition metal nitride and silicon nitride may be deposited by reactive sputtering techniques or other known deposition techniques on, a semiconductor or an electrically conductive layer, and the thickness of the mixture should be within the range of 3 to 50 nanometers. By depositing an electrically conductive layer on the oxidized mixture, a capacitor having a high dielectric, and low current leakage dielectric medium is provided.

27 Claims, 4 Drawing Figures

PROCESS FOR MAKING HIGH DIELECTRIC CONSTANT NITRIDE BASED MATERIALS AND DEVICES USING THE SAME

DESCRIPTION

1. Technical Field

This invention relates in general to process for making high dielectric constant materials and in particular to a process for making high dielectric constant nitride based materials and to devices using the same.

2. Related Application

In copending U.S. pat application Ser. No. 387,315, filed June 6, 1982, now U.S. Pat. 4,432,035 and entitled "Method of Making High Dielectric Constant Insulators and Capacitors Using Same", and assigned to the present assignee, there is disclosed and claimed a novel process for making a dielectric material, which process comprises the steps of providing a layer of a transition metal-silicon alloy having from about 40% to 90% transition metal by atomic volume, and oxidizing the layer to produce a mixture of an oxide of the transition metal and an oxide of silicon. There are also disclosed and claimed, in that same application, capacitor structure having dielectric layers made using such a process.

BACKGROUND

In the production of small geometry semiconductor devices there is a need for high dielectric constant materials for use in charge storage device applications. Among the dielectric materials most commonly used for such applications are silicon dioxide, silicon nitride or a combination thereof. Other dielectric materials have also been used to make thin film capacitors. These include thermally grown silicon nitride and transition metal oxides such as tantalum oxide ($Ta_2O_5$) and hafnium oxide ($HfO_2$). However, it has been found that a thin film of thermally grown nitride is difficult to prepare at temperatures below 1050° C. and requires a very low dew point nitrogen furnace atmosphere. Otherwise it will form a thermal oxynitride which has an even lower dielectric constant than a nitride. Silicon nitride can be formed through Chemical Vapor Deposition (CVD) but it will need an underlying thermal oxide to minimize the current leakage, because a thin silicon nitride layer formed through CVD is generally a leaky dielectric. The transition metal oxides are difficult to prepare sufficiently thin to provide the desired combination of properties such as high capacitance, low current leakage, substantial voltage breakdown strength and they are generally not stable enough at high temperatures.

The process disclosed and claimed in copending patent application Ser. No. 387,315 teaches how to make an insulating material having a substantially higher dielectric constant than that of $SiO_2$ and $Si_3N_4$ and low current leakage characteristics. It is also stable within a wide range of temperatures, i.e., between about $-150°$ C. and $+1,300°$ C. This accomplished through the oxidation, at above 400° C., of a transition metal—silicon alloy having 40% to 90% by atomic volume of the transition metal. For example, oxidizing a layer of tantalum silicide at 400° C. or higher for a sufficient period of time results in a mixture of tantalum oxide ($Ta_2O_5$) and silicon dioxide ($SiO_2$). We believe that the invention disclosed in the aforementioned patent application represents truly significant advances in the art as explained in detail in said application. Our present invention extends the developments in this area of technology and has the further advantage of providing materials having an even higher dielectric constant than the previously known materials.

SUMMARY OF THE INVENTION

It is an object of this invention to provide a new process for making new high dielectric constant materials which can be made thin with low current leakage, high breakdown voltage characteristics, and are chemically stable within a wide range of temperatures, i.e., between $-150°$ C. and $+1,300°$ C.

It is another object of this invention to provide an improved storage capacitor which includes a very thin dielectric medium having a high dielectric constant and low current leakage. It is yet another object of this invention to provide insulators which can be removed using etching techniques that leave substantially unaffected the silicon dioxide layers that are often present in adjacent regions of the same structure.

To accomplish this purpose, we have provided a new process which includes providing a layer of a mixture of a transition metal nitride and silicon nitride and oxidizing this layer so as to convert at least a portion of the transition metal nitride into its corresponding oxide. This mixture, for example, may consist prior to oxidation of 55% hafnium nitride (HfN) and 45% silicon nitride ($Si_3N_4$) by atomic volume. Following oxidation of the mixture the HfN converts into $HfO_2$ which increases substantially the dielectric constant characteristics of the mixture. The group of transition metals is meant to include such elements as hafnium (Hf), tantalum (Ta), zirconium (Zr), titanium (Ti), yttrium (Y) and the rare earth metals [lanthanum (La) through lutetium (Lu) as appearing in the periodic table].

This material may be formed on an electrically conductive layer or on an insulating layer that is oxidation resistant. If it is formed on an electrically conductive layer and subsequent to the oxidation of the mixture of the transition metal nitride and silicon nitride, a second conductive layer is deposited over the mixture, then an improved high capacitance capacitor is formed.

The foregoing and objects, features and advantages of the invention will be apparent from the following description taken in conjunction with the accompanying drawings.

DETAILED DESCRIPTION

Figure 1:
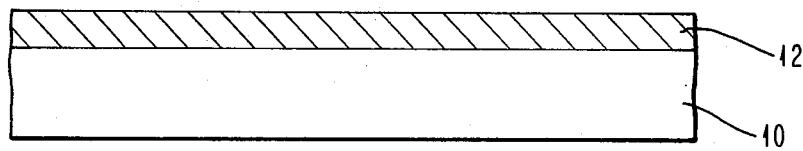
FIG. 1 is a diagrammatic cross-sectional view of a layer of a mixture containing a transition metal nitride and silicon nitride deposited on a surface of a semiconductor substate in accordance with the teaching of this invention.

Referring now to FIG. 1, there is shown a diagrammatic cross-sectional view of a semiconductor substrate 10 on a surface of which there is formed a layer 12 which is a mixture of a transition metal nitride, such as for example hafnium nitride (HfN), and silicon nitride ($Si_3N_4$). The mixture of HfN and $Si_3N_4$ may be deposited to form a layer, having a thickness between 3 and 50 nanometers, on a semiconductor substrate, such as silicon, using reactive sputtering techniques. Such a layer may also be formed through other well known deposition techniques, such as reactive evaporation (in the presence of nitrogen or ammonia), or chemical vapor deposition. In such a layer, the HfN concentration may be in a range of 25% to 55% by atomic volume. Such a film behaves like an insulator even when it has a majority composition of HfN which by itself is considered a conductive material. When an HfN $Si_3N_4$ mixture is oxidized, preferably in dry oxygen, at a temperature of about 600° C. or higher, for sufficient time, it converts substantially all of the HfN $Si_3N_4$ mixture into a layer 12 which includes a mixture of hafnium oxide ($HfO_2$) and $Si_3N_4$. Such a layer 12 may be patterned with any suitable etching technique to form any desirable design, such as dielectric segments for storage capacitors.

The etching technique may be any dry or wet etching process that is normally used for etching silicon nitride.

Figure 2:
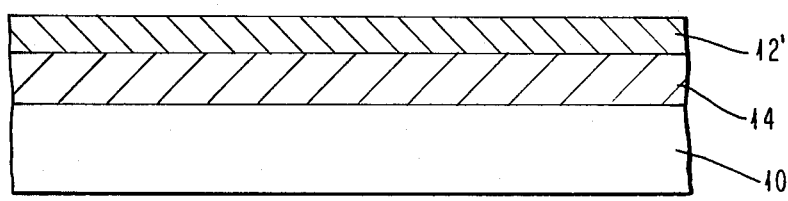
FIG. 2 is a diagrammatic cross-sectional view of another dielectric structure having two dielectric layers formed in accordance with the teachings of this invention.

Referring now to FIG. 2, there is shown a semiconductor substrate 10, such as silicon, on which there is a thin silicon dioxide ($SiO_2$) layer 14 having a thickness on the order 3 to 50 nanometers. A mixture of a transition metal nitride, such as for example HfN (plus $Si_3N_4$), is deposited over the $SiO_2$ layer 14 and oxidized to convert the HfN/$Si_3N_4$ mixture into a mixture of $HfO_2$/$Si_3N_4$ 12'. The presence of the $SiO_2$ layer 14 between the thin high dielectric constant nitride based insulator 12' is in order to further reduce the current leakage between the very thin insulator 12' and the substrate 10. The combined dielectric structure produced by layers 14 and 12' can be made very thin approximately in a range of 2 to 20 nanometers of $SiO_2$ equivalent, with a substantially higher dielectric constant and breakdown voltage characteristics.

Figure 3:
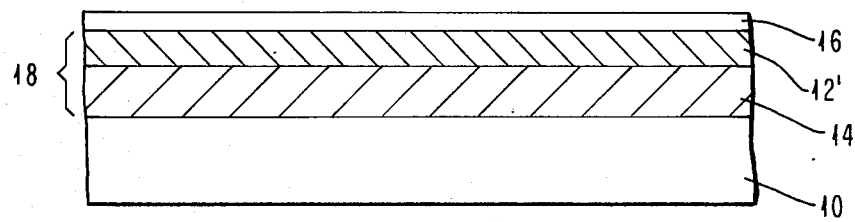
FIG. 3 is a diagrammatic cross-sectional view of a structure similar to that of FIG. 2 with a capacitor electrode or plate deposited thereon.

Referring now to FIG. 3, there is shown a diagrammatic cross-sectional view of a structure such as that shown in FIG. 2, which further includes a conductive layer 16 made, for example, from doped (with a conductivity determining impurity) polycrystalline silicon, a metal silicide or a metal, deposited on dielectric layer 12' to form a capacitor having electrodes or plates 10 (wherein the substrate is doped to be conductive) and conductive layer 16 with the dielectric medium 18 composed of dielectric layer 14 and 12'. The capacitor shown in FIG. 3 and made in accordance with the teachings of this invention has a dielectric medium 18 having a dielectric constant which is several times greater than that of silicon dioxide and greater than that of silicon nitride, or silicon oxynitride. It also has a current leakage which is as good as any of a previously known structure. Furthermore, the dielectric medium 18 can withstand temperatures of 1,000° C. and higher for long periods of time without adversely affecting its insulating index. A capacitor having the characteristics indicated hereinabove is particularly useful in semiconductor integrated circuits such as storage transistors or nodes in very dense memory systems.

Figure 4:
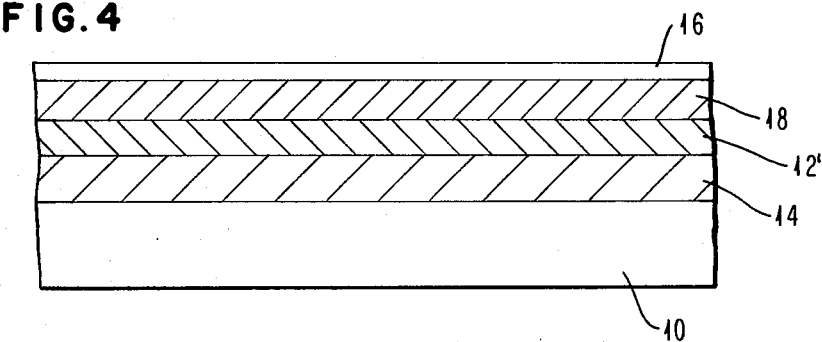
FIG. 4 is a diagrammatic cross-sectional view of a structure similar to that of FIG. 3 with its dielectric structure having three dielectric layers formed in accordance with the teachings of this invention.

Referring now to FIG. 4, there is shown a diagrammatic cross-sectional view of a structure such as that shown in FIG. 3, which further includes an additional dielectric layer 18, such as a layer of silicon nitride, between the transition metal oxide/silicon nitride layer 12' and electrode 16. The addition of this layer further improves the dielectric properties of the dielectric medium of the capacitor.

Although most of the discussions above referred to dielectrics made from hafnium nitride, it should be understood that other transition metal nitrides, such as those made of tantalum (Ta), zirconium (Zr), titanium (Ti), yttrium (Y) and the rare earth elements [lanthanum (La) through lutetium (Lu)], may also be used. Preferred transition metal nitrides in addition to hafnium nitride (HfN), is tantalum nitride ($Ta_3N_5$). After oxidation a mixture of tantalum nitride and silicon nitride a mixture layer 12' is produced, which includes tantalum pentoxide ($Ta_2O_5$) and silicon nitride. It should also be understood that the layer 12 in FIG. 1 may include any mixture of a transition metal nitride and silicon nitride having about 25% to 55% transition metal nitride by atomic volume so that layer 12' comprises a mixture which includes an oxide of the transition metal and silicon nitride.

As is known, silicon dioxide has a dielectric constant of 3.9, and silicon nitride has a dielectric constant in the range of 6 to 7, whereas oxides of transition metals such as hafnium have a dielectric constant of about 30. However, hafnium oxide has a leakage which is about 100,000 times that of silicon dioxide and, furthermore, hafnium oxide cannot withstand temperatures higher than 400° C. to 500° C. without adversely affecting its insulating quality. Accordingly, when hafnium oxide is used in semiconductor integrated circuits, it must be formed late in the integrated circuit process after all hot process steps have been performed.

By using the process of the present invention to produce dielectric materials consisting of a mixture of a transition metal oxide (such as hafnium oxide) and silicon nitride, the current leakage, at a 5 volt applied bias, is considerably decreased from that found in dielectric material using transition metal oxides alone. The current leakage is further improved by using the dual layer dielectric of the present invention as shown in FIG. 3.

Although the substrate 10 in FIGS. 1 and 2 was indicated as being made of a semiconductor material, such as silicon, it should be understood that the substrate 10 may also be made of some other conductive or insulating material as long as the material is oxidation resistant. However, if the dielectric structure is to be used as the dielectric medium of a capacitor, then substrate 10 should be a doped semiconductor material or some other conductive material suitable for forming capacitor electrodes.

It can be seen that a novel dielectric mixture for a capacitor has been provided which is made by oxidizing a layer of a mixture of a transition metal nitride and silicon nitride. The preferred range for the transition metal nitride in the mixture is about 25% to 55% with the remaining made up of silicon nitride. The transition metal nitride and the silicon nitride are deposited onto a substrate, which may be made of a semiconductor, conductor or insulator material.

The structure is then oxidized, preferably in dry oxygen, although wet oxygen may also be used, at a temperature which is preferably 800° C. or higher for several minutes or longer until all of the transition metal nitride in the mixture is converted into a transition metal oxide. The new mixture of transition metal oxide and silicon nitride preferably has a thickness of 5 to 50 nanometers. The new mixture may be patterned by known etchants, e.g., techniques used with dry or wet etching processes for patterning silicon nitride layers. If the substrate is a conductor, then an electrically conductive layer, which may be made of dope polysilicon, a silicide or a metal, can be deposited onto the dielectric mixture to produce a high dielectric constant low leakage capacitor.

Furthermore, a homogeneous transition metal oxide/silicon nitride mixture may also be directly formed during deposition, by use of known reactive sputtering or reactive evaporation techniques or chemical vapor deposition. To obtain the highest achievable electrical quality, the nitride mixture derived from the above indicated techniques should be subsequently heated within an oxygen atmosphere under the same temperature conditions identified hereinabove.

It has been found that direct insertion of the substrate with the transition metal nitride/silicon nitride into an oxidation atmosphere is desired. For densely packed, full sized silicon wafers, it is desired to utilize slow insertion into a furnace so as to achieve uniform conversion. Non-uniformity results from both uneven heating and the rapidity of the conversion reaction. The mechanism is believed to be similar to that observed for oxidation of porous silicon, i.e., very rapid intergranular penetration of the oxidant followed by diffusion limited radial penetration into the core of the porous metal silicide grain. Transition metal nitrides that have been annealed or pre-sintered do not convert readily. For sufficiently thin converted nitrides over bare silicon substrates, growth of an interface silicon dioxide occurs as a function of oxidation time. This condition provides stable capacitor-voltage traces with little hysteresis and moderately low interface states. For less current leakage through the dielectric, it is preferable to form a somewhat thicker (in a range of 3 to 10 nanometers) of silicon dioxide on the surface of the substrate prior to the deposition of the mixture.

Accordingly, a capacitor including a dielectric medium having a high quality index, i.e., high dielectric constant and low current leakage, particularly suitable for use in dense integrated memory circuits, has been provided by employing a simple fabrication process. Furthermore, the dielectric medium may be produced at any stage during the making of semiconductor integrated circuits since the dielectric medium can readily withstand and is stable at high temperatures of more than 1000° C. without destroying the high quality index of the dielectric medium.

While the invention has been described in connection with a preferred sequence of process steps used to fabricate a basic dielectric structure, it will be understood that the invention is not limited to those particular process steps, their sequence, or the final structures depicted in the drawings. On the contrary, it is intended to cover all alternatives, modifications and equivalents, as may be included within the spirit and scope of the invention as defined in the appended claims.

What is claimed is:

1. A process for making a dielectric material comprising the steps of:
   providing a layer of a mixture of a transition metal nitride and silicon nitride; and
   oxidizing said layer so as to convert at least a portion of said transition metal nitride into an oxide of said transition metal.

2. A process as set forth in claim 1 wherein the content of said transition metal nitride in said layer prior to said oxidizing step is between 25% and 55% by atomic volume.

3. A process as set forth in claim 2 wherein said layer is formed by reactively sputtered mixtures of a transition metal nitride and silicon nitride.

4. A process as set forth in claim 2 wherein said layer is formed by reactively evaporating on a substrate a transition metal nitride and silicon nitride.

5. A process as set forth on claim 2 wherein said layer is formed by the chemical vapor deposition from a transition metal containing compound, silane and ammonia.

6. A process as set forth in claim 2 wherein said layer is oxidized at a temperature higher than 600° C.

7. A process as set forth in claim 2 wherein said mixture has a thickness between 3 and 50 nanometers.

8. A process as set forth in claim 1 wherein said transition metal nitride is oxidized until all of it is converted into its corresponding transition metal oxide.

9. A process as set forth in claim 1 wherein said transition metal nitride is oxidized in dry oxygen.

10. A process as set forth in claim 1 wherein said transition metal is selected from the group consisting of hafnium, tantalum, zirconium, titanium, yttrium, and lanthanum.

11. A process as set forth in claim 1 wherein said layer is deposited on a substrate.

12. A process as set forth in claim 11 wherein said substrate is an electrically conductive substrate and further including depositing a conductive material on said layer.

13. A process for making a dielectric material which includes oxidizing a mixture of a transition metal nitride and silicon nitride until all of the transition metal nitride is converted into an oxide, said transition metal nitride being between 25% and 55% of said mixture by atomic volume and said transition metal being selected from the group consisting of hafnium, tantalum, zirconium, titanium, yttrium, and lanthanum.

14. A process for making a dielectric structure comprising:
   forming a layer of silicon dioxide on a surface of a semiconductor substrate;
   forming a layer of a mixture of a transition metal nitride and silicon nitride on said layer of silicon dioxide;
   oxidizing said structure so as to convert at least a portion of said transition metal nitride into an oxide of said transition metal.

15. A process as set forth in claim 14 wherein said mixture is a homogeneous mixture.

16. A process as set forth in claim 14 wherein said structure is oxidized until all of its transition metal nitride is converted into its corresponding transition metal oxide.

17. A process as set forth in claim 14 wherein the percentage of said transition metal in said mixture is from about 25% to 55% by atomic volume.

18. A process as set forth in claim 14 wherein said structure is oxidized at a temperature of 600° C. or higher.

19. A process as set forth in claim 14 wherein said layer of silicon dioxide has a thickness between 3 and 10 nanometers.

20. A process as set forth in claim 14 wherein said layer of a mixture of a transition metal nitride and silicon nitride has a thickness between 5 and 50 nanometers.

21. A process as set forth in claim 14 which further includes forming an additional layer of a dielectric material on said layer of said mixture after said oxidizing step.

22. A process as set forth in claim 21 wherein said material in said additional layer is silicon nitride.

23. A process as set forth in claim 14 wherein said dielectric structure is formed on a electrically conductive substrate.

24. A process as set forth in claim 23 which further includes forming a conducting layer on said mixture following said step of oxidizing said structure so as to form a capacitor.

25. A capacitor structure formed by a process comprising:
   forming a mixture of a transition metal nitride and silicon nitride on a surface of a first conductive layer;
   oxidizing said mixture to convert at least a portion of said transition metal nitride into an oxide of said transition metal;
   and forming a second conductive layer on said mixture.

26. A capacitor structure as set forth in claim 25 which further includes a layer of silicon dioxide between said mixture and said first conductive layer.

27. A capacitor as set forth in claim 26 which further includes a layer of silicon nitride between said mixture and said second conductive layer.

* * * * *